United States Patent [19]

Iimori

[11] Patent Number: 4,473,294

[45] Date of Patent: Sep. 25, 1984

[54] COPYING APPARATUS

[75] Inventor: Akiro Iimori, Yokohama, Japan

[73] Assignee: Tokyo Shibaura Denki Kabushiki Kaisha, Japan

[21] Appl. No.: 401,714

[22] Filed: Jul. 26, 1982

[30] Foreign Application Priority Data

Jul. 31, 1981 [JP] Japan .......................... 56-113837[U]

[51] Int. Cl.$^3$ ............................................ G03B 27/74

[52] U.S. Cl. ...................................................... 355/68

[58] Field of Search .................................. 355/68, 67

[56] References Cited

U.S. PATENT DOCUMENTS

| | | | |
|---|---|---|---|
| 3,926,518 | 12/1975 | Berry et al. | 355/68 |
| 3,947,117 | 3/1976 | Basu et al. | 355/68 |
| 4,017,180 | 4/1977 | Yen et al. | 355/68 |
| 4,193,674 | 3/1980 | Landa | 355/68 |
| 4,334,767 | 6/1982 | Lehman | 355/68 |

FOREIGN PATENT DOCUMENTS 1564046 4/1980 United Kingdom .

*Primary Examiner*—Monroe H. Hayes

*Attorney, Agent, or Firm*—Cushman, Darby & Cushman

[57] ABSTRACT

A copying apparatus comprises original sheet holder provided with a plane on which an original sheet is to be mounted, exposure system provided with a lens to guide light rays reflected from an impression indicated on the original sheet mounted on the holder to cause the original sheet impression to be focused on a photosensitive layer. A detector for detecting data on an average original density of the original sheet impression denoted by the light rays is set between the photosensitive layer and lens to receive part of the light rays reflected from the original sheet, on a line extending from the center of the lens to the center of that portion of the photosensitive layer which corresponds to the smallest original sheet among those which are to be mounted on the original sheet holder.

5 Claims, 6 Drawing Figures

COPYING APPARATUS

BACKGROUND OF THE INVENTION

This invention relates to a copying apparatus for transcribing the impression of an original sheet on a copy sheet, and more particularly to a copying apparatus provided with an original density-detecting device for sensing the average original density of an impression indicated on an original sheet.

A recent copying apparatus is constructed by installing a light intensity detector for sensing an intensity of light rays reflected from an original sheet placed on an original sheet-mounting section of an original sheet holder in an optical path of an exposure optical system. The light intensity detector is intended to sense the average original density of an impression indicated on the original sheet. The copying apparatus automatically controls a copy density of an impression to be copied from the result of the detection for each copying operation in order to provide a distinct copied impression.

The U.S. Pat. No. 4,017,180 already discloses the proper position of a light intensity detector included in an exposure optical system installed in a copying apparatus. According to this U.S. patent, the light intensity detector takes such a position at such a light-receiving angle as allows for the reception of light reflections from the whole surface of an original sheet-mounting section. If, therefore, the original sheet happens to be smaller than the original sheet holder and have a widely different density than an original sheet keep cover or if a book containing an original sheet to be copied has too great a thickness to have its peripheral edge fully covered with the original sheet keep cover, then the drawback arises that the result of detecting the light intensity by the detector does not fully correspond to the density of the impression indicated on the original sheet.

SUMMARY OF THE INVENTION

This invention has been accomplished in view of the aforementioned circumstances, and is intended to provide a copying apparatus which, even if an original sheet changes in size or, for example, a book-form publication containing an original sheet to be copied changes in thickness, can reliably detect the average original density of an impression indicated on an original sheet and produce a satisfactory copied impression.

According to an aspect of the present invention, there is provided a copying apparatus which comprises original sheet holding means provided with a plane on which an original sheet is to be mounted; exposure means provided with a lens to guide light rays reflected from the original sheet mounted on the holding means to cause an original sheet impression to be focused on a prescribed image forming plane, the light rays denoting data on the average original density of the impression indicated on the original sheet; a photosensitive layer formed in conformity to the prescribed image forming plane; and detecting means for detecting data on the average original density of the impression denoted by the light rays, which is set between the prescribed image forming plane and lens to receive part of the light rays reflected from the original sheet on a line extending from the center of the lens to the center of that part of the photosensitive layer which corresponds to the smallest original sheet among those which are to be mounted on the original sheet holder.

DETAILED DESCRIPTION OF THE PREFERRED EMBODIMENT

Description is now given with reference to the accompanying drawings of one embodiment of a copying apparatus according to the present invention.

Figure 1:
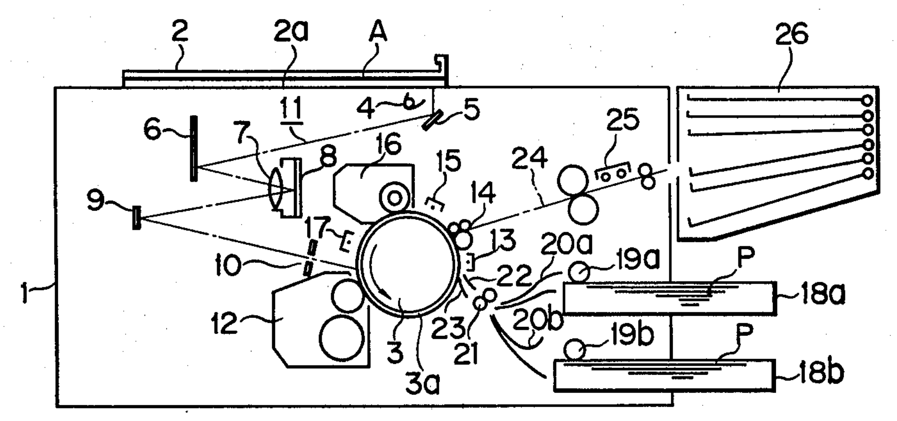
FIG. 1 is a schematic side view showing one embodiment of a copying apparatus according to the present invention.

Referring to FIG. 1, reference numeral 1 denotes a body of the subject copying apparatus. Provided above the copying apparatus body 1 is an original sheet holder 2. Set substantially in the center of the copying apparatus body 1 is a photosensitive drum 3 counterclockwise rotatable.

The copying apparatus body 1 contains an exposure optical system 11. This exposure optical system 11 is provided with a lamp 4 for illuminating an impression on the original sheet A. When the original sheet impression is illuminated by the lamp 4, light rays reflected from the impression are focused on the photosensitive layer 3*a* of the photosensitive drum 3 through the first mirror 5, second mirror 6, first lens 7, third mirror 8, fourth mirror 9 and slitted plate 10 arranged in the order mentioned along an optical path. The first mirror 5 moves with the lamp 4 leftward of the drawing, and the second mirror 6 moves also leftward. These movements of the first mirror 5 and the second mirror 6 are carried out at the speeds bearing the ratio of $1:\frac{1}{2}$. The original sheet impression is optically scanned during the above-mentioned movements. The first lens 7, third mirror 8 and fourth mirror 9 are fixed. Further, the exposure optical system 11 scans the surface of an original sheet A placed on an original sheet-mounting section 2*a* of the original sheet holder 2, projects the impression of the original sheet A placed on the original sheet-mounting section 2*a* through a slit of the slitted board 10 on the photosensitive layer 3*a* of the photosensitive drum 3. Provided around the photosensitive drum 3 are a developing device 12, transcription device 13, peeling device 14, residual image-extinguishing device 15, cleaning device 16 and electrically charging device 17, these members being arranged in the order mentioned as counted from the site at which an original sheet impression is to be focused by the exposure optical system 11 along the rotating direction of the photosensitive drum 3. An electrostatic latent image corresponding to an impression of the original sheet A is formed on the photosensitive layer 3*a* at a focusing site. In the developing device 12, the electrostatic latent image is rendered visible by a developing agent, such as a toner. The toner image is transcribed onto a copy sheet P brought to this site by the transcription device 13. After transcription of the toner image, the photosensitive layer 3*a* is cleaned by the residual image-extinguishing device 15 and cleaning device 16 to be rendered ready for the succeeding copying operation.

Detachably fitted to the right side (in the figure) of the copying apparatus body 1 are first and second copy sheet cassettes 18*a*, 18*b* which can selectively hold a pile of copy sheets P having different sizes. Selectively stored in the first copy sheet cassette 18*a* is a pile of copy sheets Pa having a ledger size (279.4×431.8 mm or 11×17 inch) or a pile of copy sheets Pb having a letter size (215.9×279.4 mm or 81½×11 inch). Also selectively stored in the second copy sheet cassette 18*b* is a pile of copy sheets Pc having a legal size (215.9×355.6 mm or 81×14 inch) or a pile of copy sheets Pd having a statement size (139.7×215.9 mm or 5½×8½inch).

When a feed roller 19*a* or 19*b* is selectively rotated, a copy sheet of the prescribed size selected from those stored in the first and second copy sheet cassettes 18*a*, 18*b* is drawn into the copying apparatus body 1. A copy sheet P drawn out is carried forward by means of a copy sheet guide 20*a* or 20*b* with the leading end of the copy sheet P clamped between the mutually contacting sections of a pair of aligning rollers 21. The paired aligning rollers 21 are rotated in the same timing as the transcription of a toner image to the photosensitive layer 3*a* to carry the copy sheet P to the transcription device 13. The carried copy sheet P is brought along guide boards 22, 23 into a transcription area defined between the transcription device 13 and photosensitive drum 3. At this time, the transcription device 13 transcribes a toner image previously set on the photosensitive layer 3*a* to the copy sheet P. The copy sheet P on which the toner image has been transcribed is peeled off the photosensitive layer 3*a* by the peeling device 14 and is taken into a copy sheet-forwarding path 24. A fixing device 25 is provided in the intermediate part of the copy sheet-forwarding path 24. The fixing device 25 carries out the fixation of a toner image on the copy sheet P. The copy sheet P on which the original sheet impression has been fixed is taken out to a sorter 26.

Figure 2:
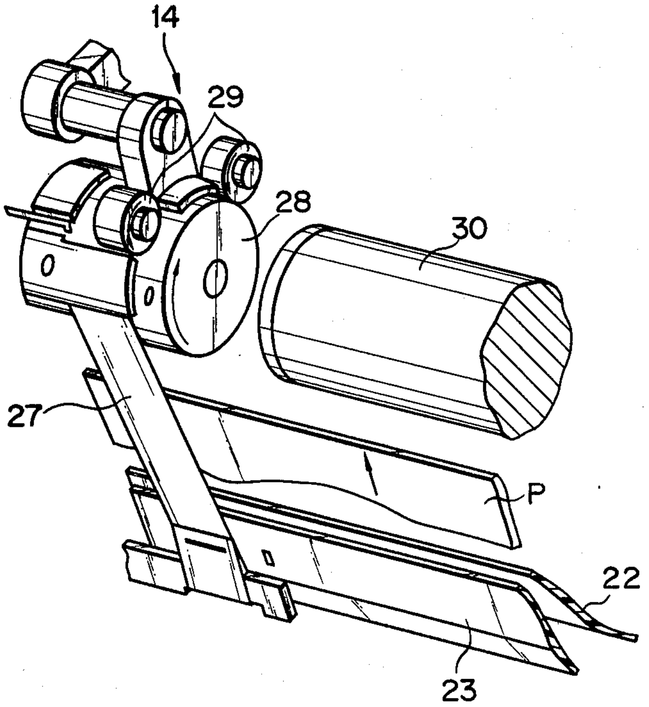
FIG. 2 is an oblique view showing a peeling device for peeling off a copied sheet from a photosensitive layer.

With the peeling device 14, the rear edge of the copy sheet P is peeled off, as shown in FIG. 2, from the photosensitive layer 3*a* of the photosensitive drum 3 by means of a peeling tape 27. The peeled portion of the copy sheet P is interposed between a turn roller 28 and a pair of guide rollers 29 normally contacting the turn roller 28. As a result, the copy sheet P is fully peeled off the photosensitive layer 3*a* and taken into the copy sheet-forwarding path 24. Reference numeral 30 denotes a turn guide for guiding the copy sheet P.

Due to the above-mentioned arrangement, the copy sheet P brought to the transcription section cannot be peeled off regardless of the size, unless the rear edge of the copy sheet P is caught by the peeling tape 27. Therefore, the supply of the copy sheet P is controlled such that the rear edge of the copy sheet P is caught, regardless of its size, by the peeling tape 27. Therefore, it is necessary to effect focusing with the rear edge of the photosensitive layer 3*a* taken as a base, independently of the size of the original sheet A.

Figure 3:
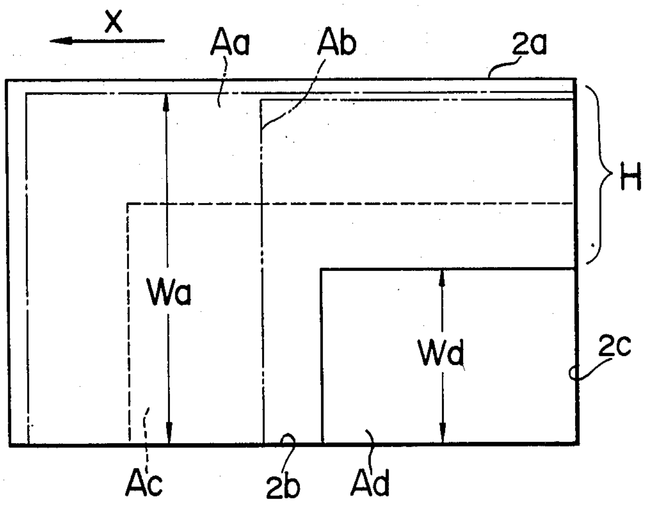
FIG. 3 is a top view of an original sheet holder, showing the sites at which original sheets having different size are to be placed.

To meet the above object, therefore, it is necessary, as shown in FIG. 3, to mount the original sheet A on the original sheet-mounting section (the glass plane) of the original sheet holder 2 regardless of the size of the original sheet such that two adjacent sides of the original sheet A are respectively aligned with the front side 2*b* of the original sheet-mounting section 2*a* and the edge 2*c* thereof constituting that side of the original sheet-mounting section 2*a* opposite to that to which scanning proceeds. To meet this requirement, it is necessary to set an original sheet Aa having a ledger size in a position defined by one dot-dash lines, an original sheet Ab having a letter size in a position defined by two dots-dash lines, an original sheet Ac having a legal size in a position defined by broken lines, and an original sheet Ad having a statement size in a position defined by solid lines. (Referring to FIG. 9, the lower side denotes the front side of the copying apparatus. An arrow X represents the direction in which the surface of the original sheet A is scanned.) It is seen from FIG. 3 that when the original sheet Ad having the statement size is set on the original sheet-mounting section 2*a*, then a surface area of the original sheet-mounting section 2*a* having a width denoted by a reference numeral H defines a space unrelated to the density of the impression indicated on the original sheet. Throughout the following description, the original sheet Ad having the statement size is taken to have the optimum smallest size.

Figure 4:
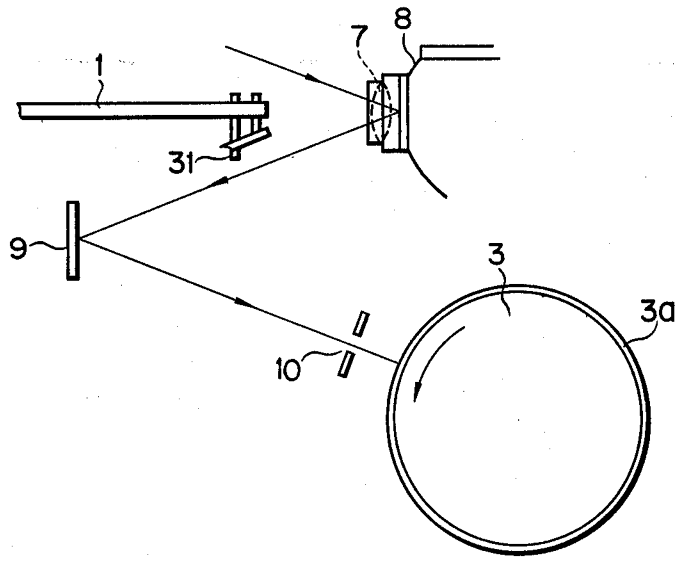
FIG. 4 is a schematic side view showing the site at which a light intensity detector is to be placed.

As shown in FIG. 4, a light intensity detector (photocell) 31 for sensing the density of an original sheet impression is set in an optical path between a first lens 7 and the photosensitive layer 3*a*. When receiving light rays reflected from a prescribed portion of the surface of the original sheet, the light intensity detector 31 detects the average original density of an impression indicated on the prescribed portion of the surface of the original sheet in accordance with the intensity of received reflected light rays. The light intensity detector 31 is connected to the lamp 4. The lamp voltage is controlled in such a manner that when the light intensity detector (photocell) 31 receives a strong intensity of light rays, the lamp voltage is kept at a low level, and when the detector 31 receives a weak intensity of light rays, the lamp voltage is raised, thereby preventing the intensity of light rays received by the detector 31 or the brightness on the photosensitive layer 3*a* of the photosensitive drum 3 from being excessively changed, even when noticeable variations take place in the average original density of the impression indicated on the original sheet A.

Figure 5:
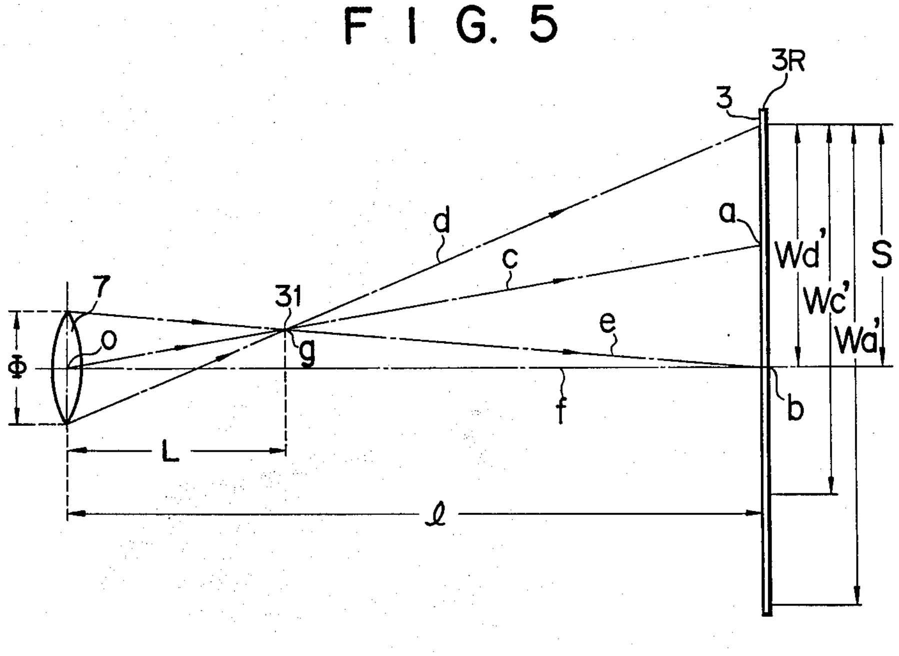
FIG. 5 is a generalized plan view of the site at which the light intensity detector is to be placed.

FIG. 5 graphically shows the position occupied by the light intensity detector (photocell) 31 along the axis of the photosensitive drum 3 (the optical axis of the lamp 4). The photosensitive layer 3*a* of the photosensitive drum 3 has a width Wa' at least the same as or larger than the width Wa of an impression indicated on the original sheet Aa having a maximum size. The midpoint of the width Wa' is indicated by reference numeral b. For the reason described with reference to FIG. 7, images corresponding to impressions indicated on the original sheet Ac having the legal size and the original sheet Ad having the statement size are focused in alignment with the rear edge 3R of the photosensitive drum 3. Reference numeral a denotes the midpoint of the width Wd' of an image corresponding to the width Wd of an impression indicated on the original sheet Ad having the statement size.

Referring to FIG. 5, let it be assumed that the light intensity detector 31 is set at a prescribed point g on a line c extending from the center o of the lens 7 having a diameter $\phi$ to the mid point a of the width Wd' to let the detector 31 have a maximum sensitivity to light rays. Then it is possible to geometrically draw an extension d of a line extending from the bottom of the lens 7 to the point g and an extension e of a line extending from the top edge of the lens 7 to the point g. That area of the photosensitive layer 3a of the photosensitive drum 3 which is defined between the extensions d, e represents the width S of the range of an original sheet impression which can be detected by the light intensity detector 31. The width S coincides with the width Wd' of an impression indicated on the original sheet Ad having the smallest statement size. The distance which is defined at this time between the center of the lens 7 and point g is represented by a reference numeral L. The light intensity detector 31 can detect a considerable portion of the widths Wa', Wc' of the impression on the original sheet Aa having the maximum ledger size and the impression on the original sheet Ac having the intermediate legal size.

Figure 6:
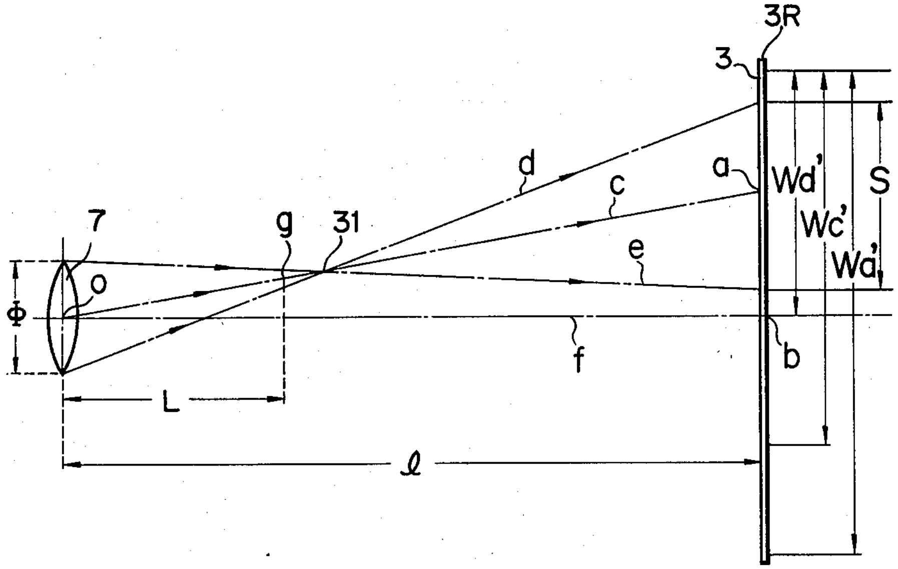
FIG. 6 is a generalized plan view of the light intensity detector of FIG. 5 slightly moved toward the photosensitive layer.

The point g on the straight line c (a plane considered in terms of three dimensions) at which the precision of detection is most affected always falls on the center a of the width Wd' of the impression indicated on the smallest original sheet Ad, no matter how the light intensity detector 31 is shifted along the straight line c toward the photosensitive layer 3a. Though, therefore, the width S of the range of detection by the light intensity detector 31 somewhat decreases as shown in FIG. 6, the detector 31 does not receive any light reflection from other objects than the original sheet. Consequently, it is proved that a copying apparatus embodying this invention is saved from the drawbacks accompanying the conventional type.

Now let it be assumed that $\phi$ denotes the diameter of the focusing lens 7, l shows a distance from the lens 7 to the photosensitive layer 3a, and S indicates the width of that portion of the photosensitive layer 3a of the photosensitive drum 3 which corresponds to the width of an impression on an original sheet which is detected by the light intensity detector 31.

Then geometric analysis provides the following equation:

$$L:\phi=(l-L):S \qquad (1)$$

The above equation may be rewritten to determine L as follows:

$$L = \frac{\phi}{(S+\phi)} \times l \qquad (2)$$

It is therefore possible to determine from the above equation (2) the distance L extending from the center of the lens 7 to the light intensity detector 31 so that the width S of an original sheet impression detected by the light intensity detector 31 may correspond to the width Wd' of an impression on the smallest original sheet Ad. When the light intensity detector 31 is positioned on the straight line c (a plane if considered in terms of three dimensions) at a distance at least longer than L from the lens 7, then the density of an impression on an original sheet can be reliably detected.

With the copying apparatus embodying this invention, light rays reflected from the center of the prescribed smallest original sheet are designed, as described above, to reach that point at which the light intensity detector 31 indicates a maximum sensitivity to light rays. Further, light rays reflected from those regions which lie beyond the width of an impression on the smallest original sheet are prevented from entering the light intensity detector 31. With respect to, therefore, a small original sheet having a widely different density from that of, for example, an original sheet keep cover, and another original sheet contained in, for example, a book-form publication which has too great a thickness to be fully covered by the original sheet keep cover, it is possible to stably detect the average original density of an original sheet impression, thereby providing a copy sheet bearing an impression with satisfactory density. Further, the copying apparatus can indicate a property the same as or higher than the conventional type with respect to original sheets having a general size.

What is claimed is:

1. A copying apparatus which comprises:

original sheet holding means provided with a plane on which an original sheet is to be mounted;

exposure means provided with a lens to guide light rays reflected from an impression indicated on the original sheet mounted on said holding means to cause the original sheet impression to be focused on a prescribed image forming plane, said light rays denoting data on an original density of the original sheet impression;

a photosensitive layer formed in conformity with the prescribed image forming plane; and detecting means for detecting data on the original desity of the original sheet impression denoted by the light rays, which is set between the prescribed image forming plane and lens to receive part of the light rays reflected from the original sheet, on a line extending from the center of the lens to the center of that portion of the image forming plane which corresponds to the smallest original sheet among those which are to be mounted on the original sheet holding means, and wherein said intensity detecting means includes a light intensity detector which is set at a distance L from the lens to receive part of light rays reflected from the impression indicated on the original sheet, said distance being so defined as to satisfy the following equation:

$$L > \frac{\phi}{(S+\phi)} \times l$$

where, $\phi$: diameter of the lens l: a distance between the lens and the photosensitive layer S: the width of that portion of the photosensitive layer which corresponds to that of the impression on the smallest original sheet.

2. The copying apparatus according to claim 1, wherein the original sheet holding means is provided with a base line along which one side of each of the respective original sheets having different sizes is to be set

3. The copying apparatus according to claim 2, wherein said base line includes one edge of the original sheet-mounting plane.

4. The copying apparatus according to claim 1, wherein the light intensity detector is provided with a light-receiving section having a maximum sensitivity to light rays at the center thereof, said section having the maximum sensitivity to light rays being positioned on the line extending from the center of the lens to the center of that part of the photosensitive layer which corresponds to the smallest original sheet.

5. The copying apparatus according to claim 1, wherein the exposure means provided with a lamp for illuminating the impression indicated on the original sheet mounted on the holding means, and said detecting means is connected to the lamp to control an intensity light rays from the lamp.

* * * * *